United States Patent
Chen et al.

(10) Patent No.: US 10,498,158 B2
(45) Date of Patent: Dec. 3, 2019

(54) WATCH STRAP BATTERY

(71) Applicant: Superior Communications, Inc., Irwindale, CA (US)

(72) Inventors: George Chen, Chatsworth, CA (US); Samuel Sentosa, Rancho Cucamonga, CA (US); Adam Cho, Monrovia, CA (US); Timothy Ng, Monrovia, CA (US)

(73) Assignee: SUPERIOR COMMUNICATIONS, INC., Irwindale, CA (US)

( * ) Notice: Subject to any disclaimer, the term of this patent is extended or adjusted under 35 U.S.C. 154(b) by 254 days.

(21) Appl. No.: 15/079,711

(22) Filed: Mar. 24, 2016

(65) Prior Publication Data

US 2016/0291550 A1    Oct. 6, 2016

Related U.S. Application Data

(60) Provisional application No. 62/140,657, filed on Mar. 31, 2015, provisional application No. 62/156,858, filed on May 4, 2015.

(51) Int. Cl.
| | |
|---|---|
| *H02J 7/00* | (2006.01) |
| *H02J 7/02* | (2016.01) |
| *H01M 10/46* | (2006.01) |
| *H01M 10/42* | (2006.01) |
| *H02J 50/10* | (2016.01) |
| *A44C 5/00* | (2006.01) |
| *G04G 19/00* | (2006.01) |

(52) U.S. Cl.
CPC ............ *H02J 7/025* (2013.01); *A44C 5/0007* (2013.01); *H01M 10/425* (2013.01); *H01M 10/46* (2013.01); *H02J 50/10* (2016.02); *G04G 19/00* (2013.01); *H01M 2220/30* (2013.01); *H02J 7/0042* (2013.01)

(58) Field of Classification Search
CPC ......... G04G 17/06; G04G 19/00; H02J 50/10; H02J 7/025; H02J 7/0042; H01M 10/425; H01M 10/46; H01M 2/30; H01M 2/0207; H01M 2220/30; H01M 2220/03; A44C 5/0007
See application file for complete search history.

(56) References Cited

U.S. PATENT DOCUMENTS

| | | | | |
|---|---|---|---|---|
| 3,670,491 A | * | 6/1972 | Weschler | G04C 10/00 136/205 |
| 4,470,708 A | * | 9/1984 | Nee | G04B 37/0033 368/223 |
| 4,847,818 A | * | 7/1989 | Olsen | H04B 1/385 368/10 |

(Continued)

*Primary Examiner* — Naum Levin
(74) *Attorney, Agent, or Firm* — Snell & Wilmer LLP

(57) ABSTRACT

A watch strap for an electronic watch. The watch strap includes a strap for extending over the wrist of a user, the strap including a first section and a second section, the first section having an end and the second section having an end. The watch strap includes a power connector extending from the end of the first section and a cavity positioned at the end of the second section and configured to receive the power connector. The watch strap includes a power source coupled to the strap and configured to be charged by power received from the power connector. The watch strap includes a wireless charging terminal configured to transmit power from the power source to the electronic watch.

15 Claims, 14 Drawing Sheets

(56) References Cited

U.S. PATENT DOCUMENTS

| | | | |
|---|---|---|---|
| 5,008,864 A * | 4/1991 | Yoshitake | G04B 47/025 368/10 |
| 6,265,789 B1 * | 7/2001 | Honda | H01F 38/14 307/33 |
| 6,854,978 B2 * | 2/2005 | Noirjean | H01Q 1/273 343/718 |
| 7,158,449 B2 * | 1/2007 | Fujimori | G04C 3/008 368/160 |
| 7,265,520 B2 * | 9/2007 | Kosuda | G04C 10/00 320/149 |
| 7,618,260 B2 * | 11/2009 | Daniel | A44C 5/0007 24/311 |
| 7,946,758 B2 * | 5/2011 | Mooring | G04B 37/005 368/276 |
| 8,467,270 B2 * | 6/2013 | Gossweiler, III | G04G 17/06 345/173 |
| 8,541,745 B2 * | 9/2013 | Dickinson | G04G 21/00 250/340 |
| 8,562,489 B2 * | 10/2013 | Burton | G04F 10/00 482/9 |
| 8,954,135 B2 * | 2/2015 | Yuen | A61B 5/0205 600/476 |
| 8,976,628 B2 * | 3/2015 | Leoni | G04G 21/00 368/10 |
| 9,110,498 B2 * | 8/2015 | Martinez | A61B 5/681 |
| 9,236,756 B2 * | 1/2016 | Jenwatanavet | H02J 17/00 |
| 9,331,731 B2 * | 5/2016 | Wang | H02J 7/025 |
| 9,539,486 B2 * | 1/2017 | Weast | G06F 1/163 |
| 9,678,547 B1 * | 6/2017 | Mirov | G06F 1/24 |
| 9,690,258 B2 * | 6/2017 | Wilson | A45F 5/00 |
| 9,750,316 B2 * | 9/2017 | Baek | A44C 5/246 |
| 9,768,628 B2 * | 9/2017 | Fish | H02J 7/0042 |
| 9,887,503 B1 * | 2/2018 | Quinlan | H01R 24/64 |
| 9,923,383 B2 * | 3/2018 | Ritter | H02J 5/005 |
| 2004/0145975 A1 * | 7/2004 | Barras | G04G 21/04 368/281 |
| 2009/0231960 A1 * | 9/2009 | Hutcheson | G04G 17/04 368/10 |
| 2010/0194333 A1 * | 8/2010 | Kassayan | H02J 50/10 320/108 |
| 2014/0362544 A1 * | 12/2014 | Han | G04G 17/06 361/749 |
| 2014/0375465 A1 * | 12/2014 | Fenuccio | G08B 5/36 340/691.1 |
| 2015/0063075 A1 * | 3/2015 | Baek | G04G 17/04 368/10 |
| 2015/0220109 A1 * | 8/2015 | von Badinski | G01P 15/00 340/539.12 |
| 2015/0333302 A1 * | 11/2015 | Johns | H01M 2/1066 429/127 |
| 2015/0340891 A1 * | 11/2015 | Fish | H02J 7/0042 320/103 |
| 2015/0366098 A1 * | 12/2015 | Lapetina | G04B 37/1486 361/807 |
| 2016/0174857 A1 * | 6/2016 | Eggers | G06F 19/3418 600/301 |
| 2016/0262504 A1 * | 9/2016 | Schooley | A44C 5/2057 |
| 2016/0294225 A1 * | 10/2016 | Blum | H02J 5/005 |
| 2016/0322745 A1 * | 11/2016 | Shedletsky | G06F 1/163 |
| 2017/0338449 A1 * | 11/2017 | Rho | H01M 2/0275 |
| 2018/0008016 A1 * | 1/2018 | Tahmasebzadeh | A44C 5/105 |

* cited by examiner

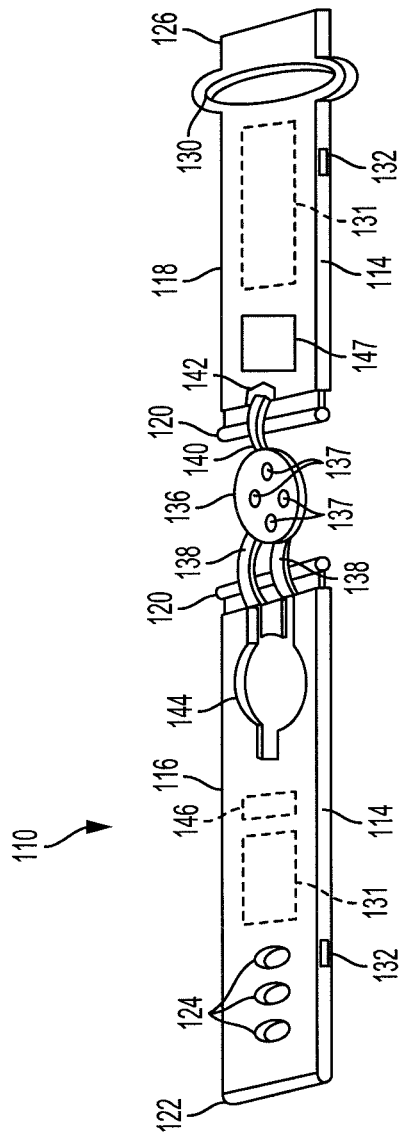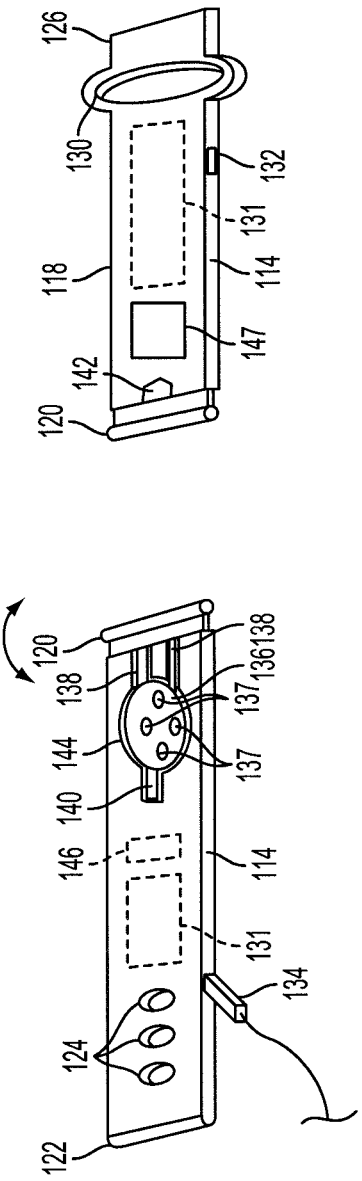

WATCH STRAP BATTERY

CROSS-REFERENCE TO RELATED APPLICATIONS

This application claims priority to and the benefit of U.S. Provisional Application No. 62/140,657, titled "WATCH STRAP BATTERY," filed on Mar. 31, 2015, and U.S. Provisional Application No. 62/156,858, titled "WATCH STRAP BATTERY," filed on May 4, 2015, the entirety of both applications are hereby incorporated by reference herein.

BACKGROUND

Field

This specification relates to a watch strap for an electronic watch.

Description of Related Art

Electronic watches have increased in complexity in recent years. However, the battery life and the storage capacity of such electronic watches have not improved. As such, consumers find it difficult to utilize an electronic watch for extended periods and have found it difficult to take full advantage of the capabilities of an electronic watch. Consumers have become frustrated with the limited storage capacity and battery life of electronic watches, which require constant recharging.

SUMMARY

In order to address such issues, embodiments of watch straps for electronic watches are disclosed herein. The watch strap may include a strap for extending over the wrist of a user, the strap including a first section and a second section, the first section having an end and the second section having an end. A power connector extends from the end of the first section. A cavity is positioned at the end of the second section and is configured to receive the power connector. A power source is coupled to the strap and is configured to be charged by power received from the power connector. A wireless charging terminal is configured to transmit power from the power source to the electronic watch.

The watch strap may include a strap for extending over a wrist of a user, the strap including an outer surface and a coupler configured to couple the strap to the electronic watch. A camera device may be positioned on the outer surface of the strap. A wireless charging terminal may be coupled to the strap and configured to transmit power to the electronic watch to charge the electronic watch.

The watch strap may include a strap for extending over a wrist of a user, the strap including a coupler configured to couple the strap to the electronic watch. The watch strap may include a rechargeable battery coupled to the strap, and may include a wireless charging terminal coupled to the strap and configured to transmit power from the rechargeable battery to the electronic watch.

BRIEF DESCRIPTION OF THE DRAWINGS

Features and advantages of the systems, apparatuses, and methods as disclosed herein will become appreciated as the same become better understood with reference to the specification, claims, and appended drawings wherein:

FIG. 1 illustrates a perspective view of a watch strap according to an embodiment of the present disclosure.

FIG. 2 illustrates a perspective view of the watch strap of FIG. 1 in a different position than shown in FIG. 1.

DETAILED DESCRIPTION

Disclosed herein is a watch strap for charging an electronic watch and storing data. Particular embodiments of the subject matter described in this specification may be implemented to realize one or more of the following advantages. The watch strap provides a battery back-up for an electronic watch, and thus, increases the amount of time that the electronic watch has available power before the electronic watch has to recharge. By increasing the amount of power available to the electronic watch, the watch strap increases the availability and mean time between recharging the electronic watch. The increase in available power allows users to use more power intensive functions the electronic watch, such as video streaming and gaming, without concern for a lack of power. Additionally, the watch strap provides for additional data storage capacity for the electronic watch. Increasing the data storage capacity of the electronic device allows users to store additional information, such as videos and photos, and provide users with more functionality, e.g., by allowing users ability to download more applications on the electronic device.

Figure 3:
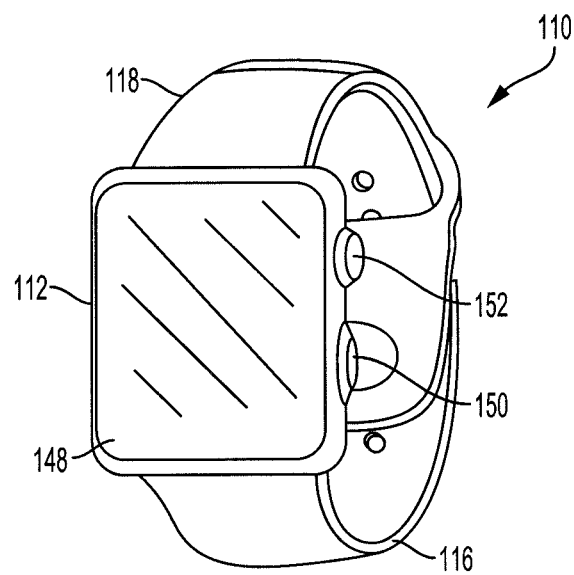
FIG. 3 illustrates a front perspective view of an electronic watch coupled to a watch strap according to an embodiment of the present disclosure.

FIG. 1 illustrates a perspective view of a watch strap 110 for an electronic watch 112, as shown in FIG. 3 for example. The watch strap 110 may include a strap 114 having a first section 116 and a second section 118. The strap 114 may include a coupler 120 for coupling the strap 114 to the electronic watch 112. The coupler 120 may be configured to removably couple to the strap 114 such that the electronic watch 112 may be removed from the coupler 120. The coupler 120 may be positioned at the ends of the respective strap sections 116, 118, and may include a first coupler positioned at an end of the first section 116, and a second coupler positioned at an end of the second section 118. The coupler 120 may include a protrusion, a slide, a pin, an adhesive connector, a magnetic connector, or other forms of couplers. The coupler 120 may be configured to slide along a mating coupler on the electronic watch 112.

The first section 116 of the strap 114 may extend from the end of the first section 116 that is coupled to the coupler 120, to another end 122 of the first section 116. The first section 116 may extend longitudinally between the ends of the first section 116. The portion of the first section 116 adjacent the end 122 of the first section 116 may form a tongue of the strap 114. The first section 116 may include one or more connectors 124 for connecting the first section 116 to the second section 118. The connectors 124 may be in the form of apertures as shown in FIG. 1. The second section 118 of the strap 114 may extend from the end of the second section 118 that is coupled to the coupler 120 to another end 126 of the second section 118. The second section 118 may extend longitudinally between the ends of the second section 118. The second section 118 may include one or more connectors 130 for connecting the first section 116 to the second section 118. The connector 130 may be in the form of an aperture as shown in FIG. 1. The connector 130 may serve as a buckle for receiving the tongue of the strap 114. In one embodiment, either of the one or more connectors 124, 130 may be a protrusion, a slide, a pin, an adhesive connector, a magnetic connector, or other forms of connector 124, 130.

The strap 114 may be made of a synthetic material, such as flexible plastic, flexible silicon, or thermoplastic, or the like. In one embodiment, the strap 114 may be made of a rubber, a metal, a fabric, or the like. In one embodiment, the strap 114 may have a different form of construction as desired.

A power source may be coupled to the strap 114. The power source may be in the form of a battery 131 that may be a rechargeable battery and may be positioned in the first section 116, the second section 118, or both, as shown in FIG. 1. The battery 131 may be configured to receive and store power, and transmit power to other devices. The battery 131 may include a series of batteries, or a single battery. The battery 131 may be rigid or flexible. For example, in one embodiment, the battery 131 may be configured to flex with the movement of the strap 114 around a user's wrist. In one embodiment, the battery 131 may be a lithium ion battery. In one embodiment, the battery 131 may be replaced by a capacitor, a solar cell, or another form of power source. In one embodiment, the power source may be a ceramic power source, such as a ceramic battery. A ceramic power source may be flexible and configured to flex with the strap 114.

The battery 131 may be positioned within the strap 114, or may be exposed outside the strap 114. In one embodiment, the battery 131 may be configured such that it is not removable from the strap 114. In one embodiment, the battery 131 may be configured such that it is separable from the strap 114. The battery 131 may extend along the length of the strap 114.

Data storage may be coupled to the strap 114. The data storage may be in the form of a memory 147 that may be volatile or non-volatile memory. The memory 147 may be a non-transitory memory or a data storage device, such as a solid-state disk drive or flash, and may be positioned in the first section 116, the second section 118, or both, as shown in FIG. 1. The memory 147 may be configured to receive and store data, and transmit data to the electronic watch 112. The memory 147 may include a series of data storage devices, or a single data storage device. The memory 147 may be rigid or flexible. For example, in one embodiment, the memory 147 may be configured to flex with the movement of the strap 114 around a user's wrist.

The memory 147 may be positioned within the strap 114, or may be accessible outside the strap 114. The memory 147 may or may not be removable and separable from the strap 114. The memory 147 may extend along the length of the strap 114.

The watch strap 110 may include a power connector 132 for receiving power for powering the battery 131. The power connector 132 may be configured as a power input port configured to receive a power plug 134 shown in FIG. 2 for example, for transmitting power to the battery 131. A power connector 132 may be positioned on the first section 116, on the second section 118, or separate connectors 132 may be positioned on both, as shown in FIG. 1. In an embodiment with separate connectors 132, one connector on the first section 116 may be configured to power a battery 131 in the first section 116, and a connector on the second section 118 may be configured to power a battery 131 in the second section 118. In one embodiment, an electrical connector may join the first section 116 and the second section 118 such that a single power connector 132 may power a battery 131 in the first section 116 and the second section 118. The use of a power connector 132 may enhance the rate at which the watch strap 110 may be charged. In one embodiment, the power connector 132 may be configured as a male connector for inserting in a female connector port.

The watch strap 110 may include a wireless charging terminal 136 configured to transmit power to the electronic watch 112. The wireless charging terminal 136 may be configured to transmit power to the electronic watch 112 wirelessly, through the use of inductive charging, for example. In one embodiment, other forms of wireless charging may be utilized. The wireless charging terminal 136 may include a loop or coil or other wireless charging device to transmit power to the electronic watch 112. The wireless charging terminal 136 may be configured to receive power wirelessly from another power source, e.g., another wireless charging terminal, to charge the battery 131. The wireless charging terminal 136 may be configured as a plate configured to be positioned over a rear surface of the electronic watch 112 to transmit power to the electronic watch 112. The wireless charging terminal 136 may be rigid or flexible. In one embodiment, the wireless charging terminal 136 may be configured as a cushion to be positioned between the user's wrist and the rear surface of the electronic watch 112. In one embodiment, the wireless charging terminal 136 may have a different construction than shown in FIG. 1, as desired.

The wireless charging terminal 136 may be configured to couple to the electronic watch 112. The wireless charging terminal 136 may be configured to couple to the electronic watch 112 with a magnetic force or the like. In one embodiment, the wireless charging terminal 136 may be configured to include a magnet, such as a permanent magnet or electromagnet for coupling to the electronic watch 112. In one embodiment, the wireless charging terminal 136 may include a mechanical coupler to couple to the electronic watch 112.

The wireless charging terminal 136 may be configured to allow visible and other forms of light to pass through. The wireless charging terminal 136 may be configured to allow infrared light to pass through. The wireless charging terminal 136 may include apertures 137 that are positioned to allow lighting or camera devices of the electronic watch 112 to transmit or receive light to or from the body of the user. In one embodiment, the entirety or a portion of the wireless charging terminal 136 may be transmissive to visible, infrared, or other forms of light. For example, the transmissive portion of the wireless charging terminal 136 may be clear or translucent or the like.

The wireless charging terminal 136 may couple to one or more connectors 138, 140, which may be electrical connectors. The connectors 138, 140 may allow the wireless charging terminal 136 to couple an end of the first section 116 to an end of the second section 118. The connectors 138, 140 may be configured to transmit power to or from the wireless charging terminal 136. The connectors 138, 140 may be separable from the strap 114 or may be non-separable. The connector 140 may be separable from the strap 114.

The connector 140 may connect to a strap connector 142 that is configured to couple to connector 140. In one embodiment, the strap connector 142 may be an electrical terminal. The connectors 138, 140 may be flexible to allow the wireless charging terminal 136 to move relative to the strap 114 yet remain connected to the strap 114. In one embodiment, the wireless charging terminal 136 may be configured to move from a first position, in which the wireless charging terminal 136 is configured to transmit power to the electronic watch 112, to a second position, in which the wireless charging terminal 136 is moved away from the electronic watch 112. In the second position, the wireless charging terminal 136 may be in a storage position.

The watch strap 110 may include a retainer device 144 configured to retain the wireless charging terminal 136. The retainer device 144 may be configured as a recess configured to receive the wireless charging terminal 136. In one embodiment, the retainer device 144 may be configured as a pin, a snap, a latch, or another retaining device for retaining the wireless charging terminal 136. The retainer device 144 may be configured to retain the wireless charging terminal 136 in the second position.

Electrical connectors may provide electrical connections between the components of the watch strap 110 disclosed herein.

In operation, the watch strap 110 may be coupled to the electronic watch 112. The battery 131 may provide power to the wireless charging terminal 136 that is transmitted wirelessly to the electronic watch 112. The wireless charging terminal 136 may be positioned over the rear surface of the electronic device 112 when the terminal 136 transmits power to the electronic watch 112. In one embodiment, to transfer power to the electronic watch 112, the wireless charging terminal 136 may be positioned as shown in FIG. 1. The connector 140 may be coupled to the strap connector 142, and one or more of the connectors 138, 140 may supply power to the wireless charging terminal 136.

The power may be transmitted until the electronic watch 112 is fully charged, or the battery 131 runs out of power, or power is no longer desired to be transmitted to the electronic watch 112. In one embodiment, the battery 131 may enter into a power save mode when the power level of the battery 131 is less than or equal to a threshold value or percentage, e.g., 10%. The power save mode may turn off transmission of power to the electronic watch 112 if the power level of the electronic watch 112 has a power level that is greater than or equal to a first threshold value or percentage and may turn on transmission of power if the power level drops below the first threshold value until the battery 131 runs out of power. A power switch may be coupled to the strap 114 and configured for a user to turn on and off the supply of power to the electronic watch 112. If a user desires to supply more power to the battery 131, then a user may provide power to the battery 131 through use of the power connector 132. In one embodiment, power may be supplied to the battery 131 by a user transmitting power to the watch strap 110 wirelessly through the wireless charging terminal 136. A user may position the wireless charging terminal 136 upon another wireless charging terminal to wirelessly transmit power to charge the battery 131. In one embodiment, a kinetic charging unit 146 may be coupled to the strap 114. The kinetic charging unit 146 may be configured to transform kinetic energy of the user into electrical power. The kinetic energy may be produced by movement of the user's wrist when the user is wearing the watch strap 110, or by other movement of the watch strap 110. The kinetic charging unit 146 may be configured to transfer the electrical power to the battery 131 to charge the battery 131. In one embodiment, the kinetic charging unit 146 may be configured to transmit power directly to the wireless charging terminal 136 to power the electronic watch 112 wirelessly.

The wireless charging terminal 136 may be positioned in the position shown in FIG. 2 if the user no longer desires to supply power to the electronic watch 112 with the wireless charging terminal 136. The connector 140 may be separated from the strap connector 142. The wireless charging terminal 136 may be moved away from the rear surface of the electronic watch 112, and may be coupled to the retainer device 144. The wireless charging terminal 136 may be flipped or folded into a storage position. The wireless charging terminal 136 in the storage position may expose the rear surface of the electronic watch 112. The exposed rear surface may allow the user to more easily charge the electronic watch 112 wirelessly with a different wireless charging terminal, for example, the dedicated wireless charging terminal that may have been supplied with the electronic watch 112. In addition, the exposed rear surface may allow the electronic watch 112 to more effectively use any sensors or other devices that are positioned on the rear surface.

The wireless charging terminal 136 may move to the storage position without the coupler 120 being separated from the electronic watch 112. This feature may allow the electronic watch 112 to be directly charged with a different wireless charging terminal, without the user needing to separate the watch strap 110 from the electronic watch 112.

FIG. 3 illustrates a front perspective view of the watch strap 110 coupled to an electronic watch 112. The electronic watch 112 may include a display 148 on a front surface, and controls such as button 150 and a knob 152 on a side surface.

Figure 4:
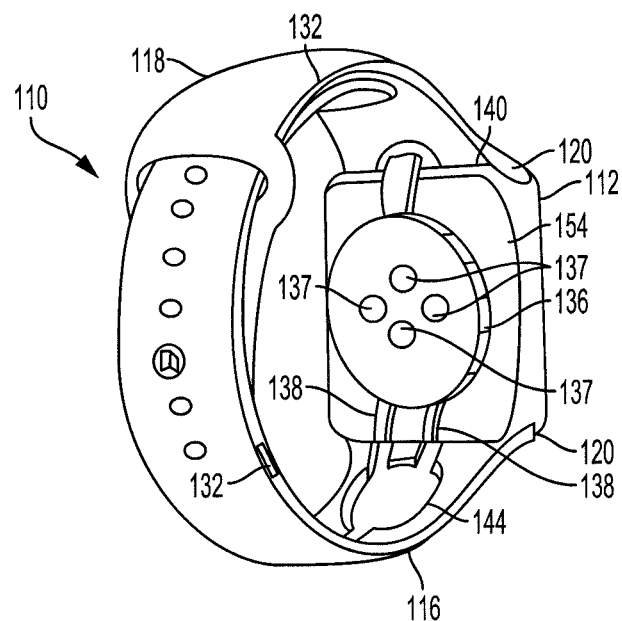
FIG. 4 illustrates a rear perspective view of the electronic watch coupled to the watch strap of FIG. 3.

FIG. 4 illustrates a rear perspective view of the watch strap 110 coupled to the electronic watch 112. The wireless charging terminal 136 is positioned over the rear surface 154 of the electronic watch 112, and the terminal 136 is positioned to transmit power to the electronic watch 112.

Figure 5:
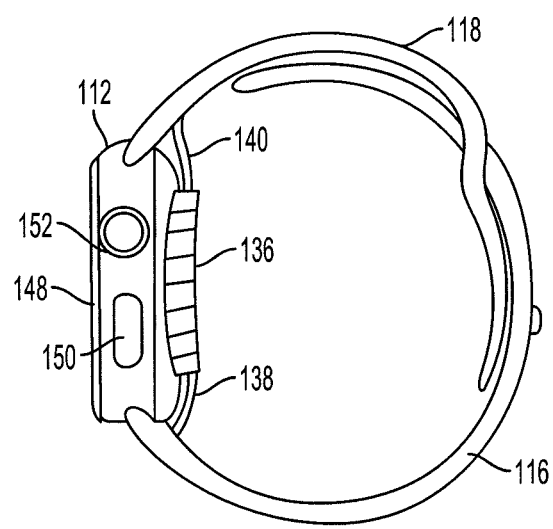
FIG. 5 illustrates a side perspective view of the electronic watch coupled to the watch strap of FIG. 3.

FIG. 5 illustrates a side view of the watch strap 110 coupled to the electronic watch 112. The wireless charging terminal 136 is positioned over the rear surface 154 of the electronic device 112.

Figure 6:
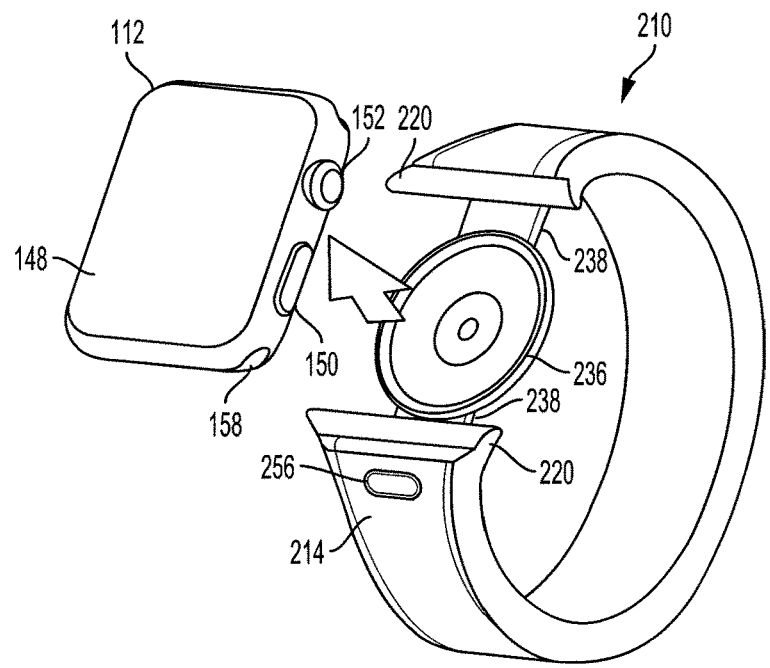
FIG. 6 illustrates a perspective view of a watch strap according to an embodiment of the present disclosure.

FIG. 6 illustrates an embodiment of a watch strap 210 including a power switch 256 coupled to the strap 214. Elements having the same last two reference numbers in this application are like elements, and the description of such like elements applies to all like elements unless otherwise specified. The strap 214 may be configured as a continuous body extending from one coupler 220 to the other coupler 220. The coupler 220 may be configured to slide into the mating connector 158 of the electronic watch 112.

The wireless charging terminal 236 may be shaped as a plate configured to be positioned over a rear surface of the electronic watch 112 to transmit power to the electronic watch 112. Connectors 238 may extend radially outwards from the wireless charging terminal 236 on opposite sides of the wireless charging terminal 236, and along a diameter of the wireless charging terminal 236. Connectors 238 may connect the wireless charging terminal 236 to the strap 214. The connectors 238 may be electrical connectors, to provide power from the internal battery of the watch strap 210 to the wireless charging terminal 236 for transmission to the electronic watch 112. The connectors 238 may be configured to transfer power from the wireless charging terminal 236 to the battery in an embodiment in which a user may position a wireless charging terminal 236 upon another wireless charging terminal 236 to wirelessly transmit power to charge the internal battery.

The connectors 238 may be fixed in position, or in one embodiment may be movable as described in regard to the connectors 138, 140 shown in FIGS. 1 and 2.

The power switch 256 may be configured to turn on or off the supply of power to be transmitted through the wireless charging terminal 236 and to the electronic watch 112. The power switch 256 may be positioned on an outer surface of the strap 214. The power switch 256 may be configured as a button to be pressed as shown in FIG. 6, or may be configured as a touchpad or motion sensor, or other form of switch.

The watch strap 210 may include a power connector for charging the internal battery, or may include another means of powering the battery.

The watch strap 210 may be configured to have a non-extendable length as shown in FIG. 6, or may have an adjustable length.

Figure 7:
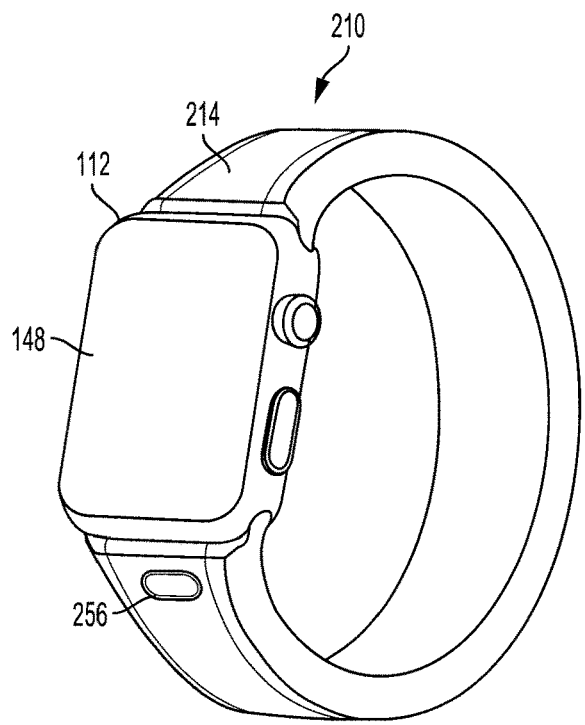
FIG. 7 illustrates a perspective view of the watch strap of FIG. 6 coupled to an electronic watch.

FIG. 7 illustrates a side perspective view of the watch strap 210 coupled to the electronic watch 212. The power switch 256 is positioned proximal the electronic watch 112.

Figure 8:
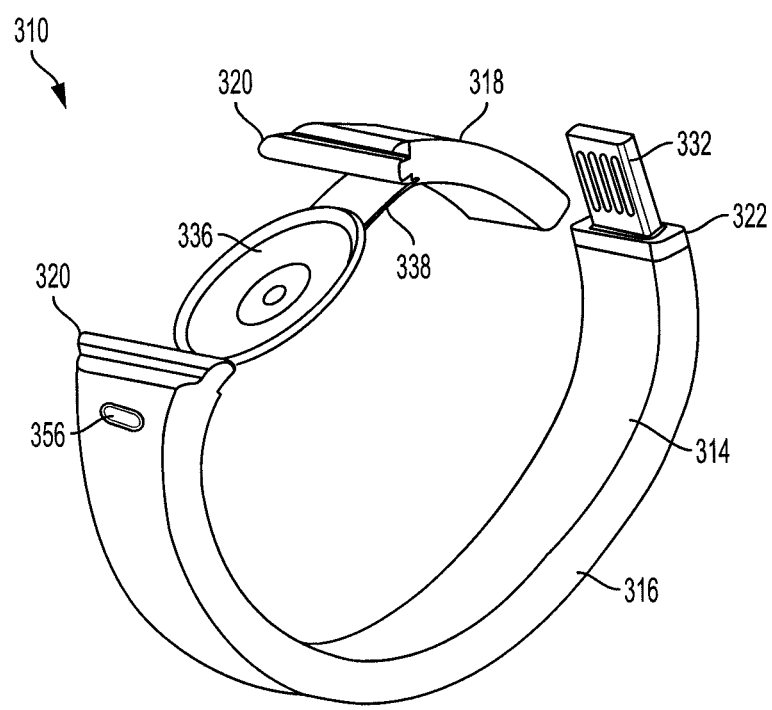
FIG. 8 illustrates a perspective view of a watch strap according to an embodiment of the present disclosure.

FIG. 8 illustrates an embodiment of a watch strap 310 in which a power and/or data storage connector 332 extends outward from an end 322 of the first section 316 of the strap 314. The power and/or data storage connector 332 may extend outward from the end 322 along the longitudinal direction of the strap 314.

The power and/or data storage connector 332 may be a male connector. The power and/or data storage connector 332 may be in the form of a USB connector, a micro-USB connector, a lightning connector, or another form of power and/or data storage connector 332. The power and/or data storage connector 332 may be a plug connector configured to insert into a cavity at the end of the second section 318 that extends in a longitudinal direction. The cavity may be configured to receive the power and/or data storage connector 332.

The power and/or data storage connector 332 may couple to the cavity and be separated from the cavity to respectively close and open the watch strap 310. The watch strap 310 may be in an open position, and then placed around a user's wrist, and then the power and/or data storage connector 332 may be inserted into the cavity to position the watch strap 310 in a closed position and secure the watch strap 310 to the user's wrist. The power and/or data storage connector 332 is configured to be removed from the cavity to move the watch strap 310 to an open position.

The power and/or data storage connector 332 may be used to charge the battery of the watch strap 310 upon the power and/or data storage connector 332 being inserted into a separate power charging device. The power switch 356 may be used to turn on or off the supply of power from the battery to the electronic device via the wireless charging terminal 336. The power switch 356 may be positioned at an end of the first section 316 proximal the electronic watch 112.

The power and/or data storage connector 332 may be used to receive, store and transmit data to the electronic watch 112. The power and/or data storage connector 332 may be inserted into a separate computing device, e.g., a personal computer, to store data from and/or transmit data to the separate computing device.

Figure 9:
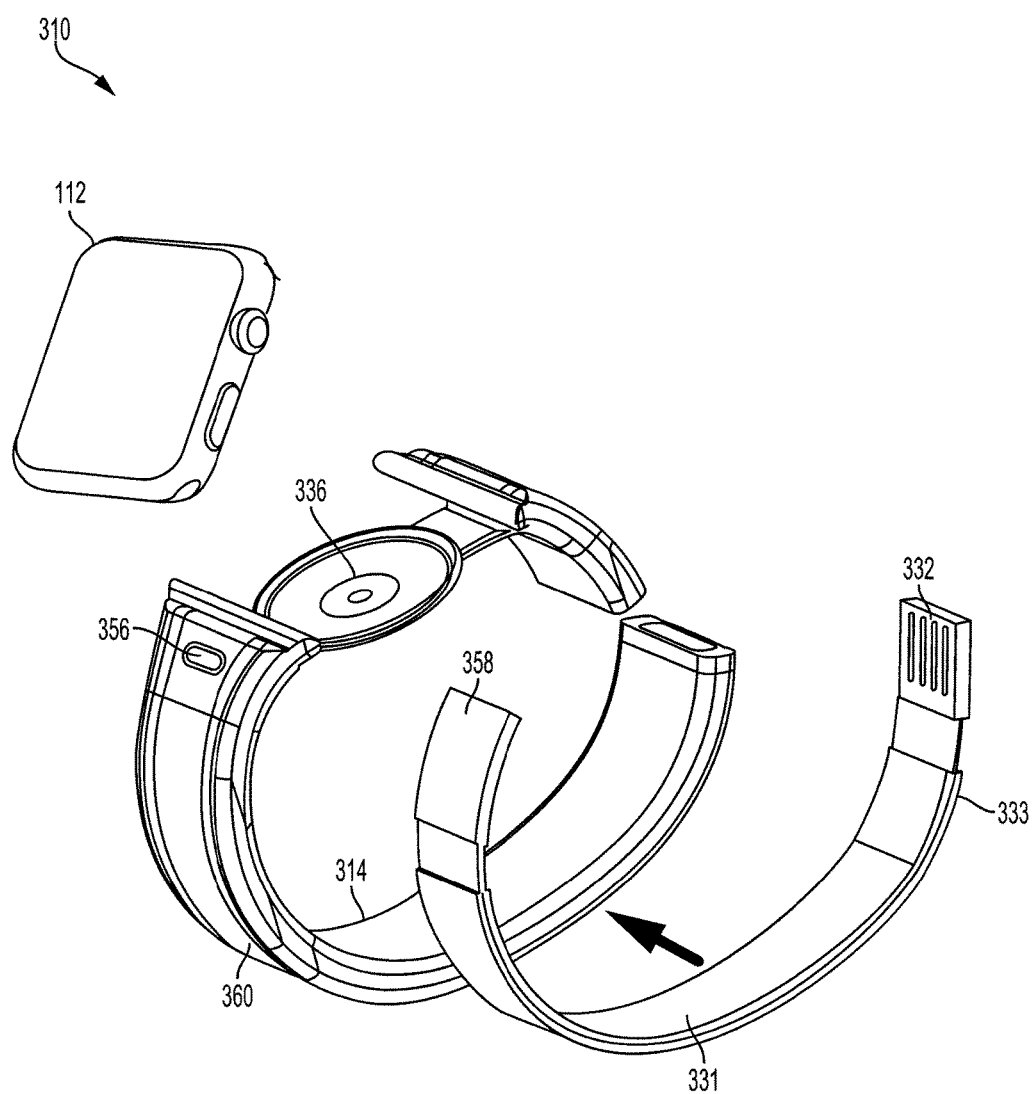
FIG. 9 illustrates a perspective view of the watch strap of FIG. 8 in a disassembled state.

FIG. 9 illustrates a view of interior components of the watch strap 310 separated from remaining portions of the watch strap 310. The battery 331 is electrically coupled to the power and/or data storage connector 332 to receive power from the power and/or data storage connector 332. The battery 331 may be shaped to extend longitudinally along the length of the watch strap 310. A circuit board 358 may be electrically connected to the battery 331 and configured to detect a user pressing or otherwise activating the power switch 356. The power switch 356 may contact the circuit board 358 to signal when power is to be transmitted to the electronic watch 112 wirelessly.

The memory 333 may be coupled to the power and/or data storage connector 332. The memory 333 may be shaped to extend longitudinally along the length of the watch strap 310 and may be adjacent to the battery 331. The strap 314 may form a sheath 360 that extends entirely around the circumference of the battery 331 and the memory 333. The wireless charging terminal 336 may wirelessly transmit and/or receive data from the electronic watch 112. The wireless charging terminal may transmit power and data storage information to the electronic watch 112 for display on the electronic watch 112 through an application, e.g., a mobile device application. The data storage information may include the available amount of memory available. The power information may include the power level of the battery 331.

Figure 10:
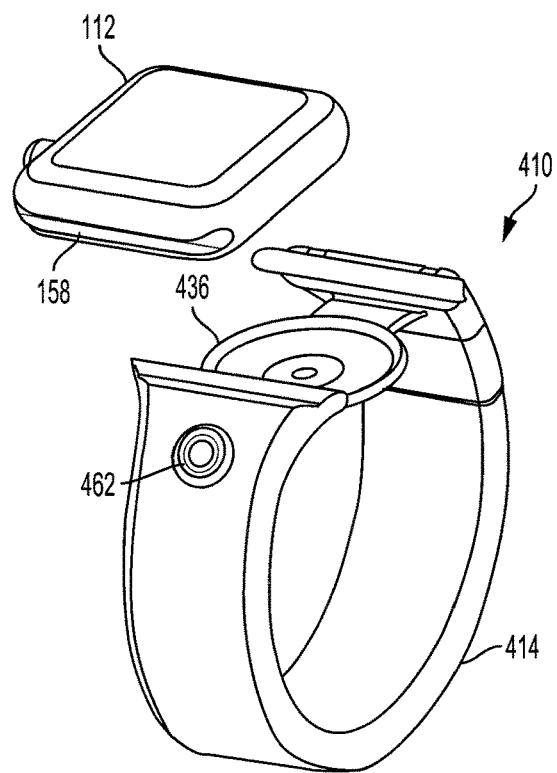
FIG. 10 illustrates a perspective view of a watch strap according to an embodiment of the present disclosure.

FIG. 10 illustrates an embodiment of a watch strap 410 including a camera device 462. The camera device 462 may include a lens and circuitry for receiving an image. The camera device 462 may be positioned on an outer surface of the strap 414 and may face outwards such that a user may capture an image with the camera device 462.

The camera device 462 may store the captured image in a memory. In one embodiment, the camera device 462 may be configured to transmit the image to the electronic watch via the wireless charging terminal 436. In one embodiment, the memory may transmit the image to a separate device via a male connector, such as the power and/or data storage connector 432 shown in FIG. 12.

Figure 11:
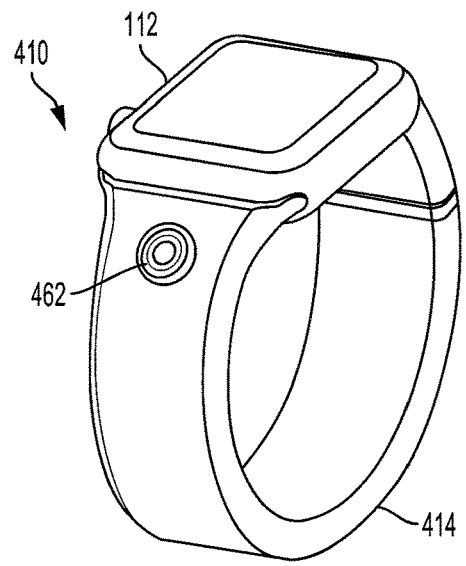
FIG. 11 illustrates a perspective view of the watch strap of FIG. 10 coupled to an electronic watch.

FIG. 11 illustrates the watch strap 410 coupled to the electronic watch 112. The camera device 462 is positioned proximal the electronic watch 112. The watch strap 410 may be configured to move between an open and closed position, as described in regard to the watch strap shown in FIGS. 8 and 9.

Figure 12:
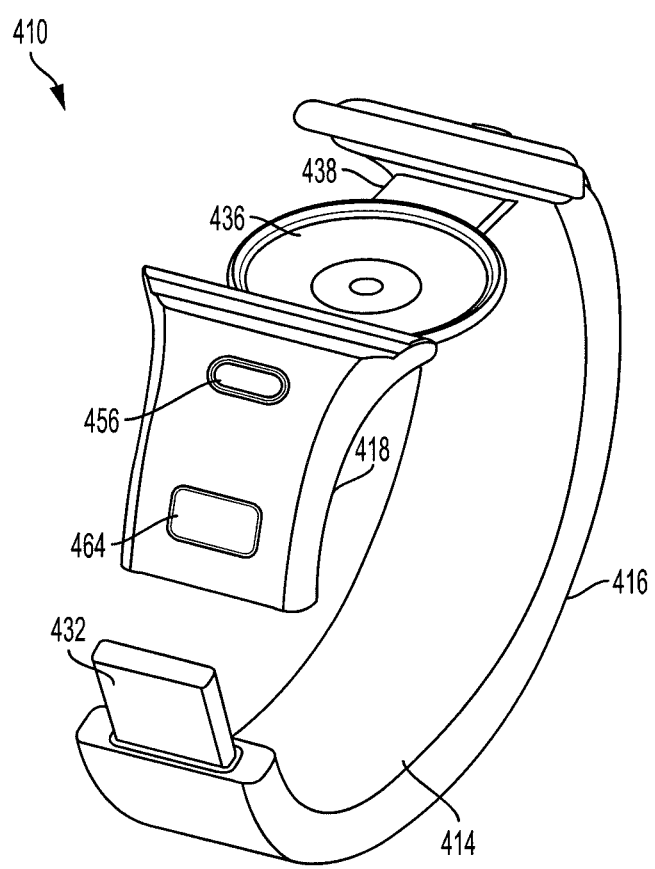
FIG. 12 illustrates a perspective view of the watch strap of FIG. 10.

FIG. 12 illustrates the watch strap 410 in an open position. A power and/or data storage connector 432 may insert into a cavity, in a similar manner as the power connector 332. A release device 464 may be operated by a user to allow the power and/or data storage connector 432 to be secured in the cavity, and may be operated to release the power connector 432 from the cavity in a closed position. The release device 464 may be a button to be pushed by a user to release the power connector 432, or another form of release device.

A power switch 456 may be positioned on the outer surface of the strap, on the second section 418. The power switch 456 may control whether power is provided from the battery to the electronic watch wirelessly. In one embodiment, the power switch 456 may be substituted with or supplemented with a control device for controlling the camera device 462. Such a control device may include a switch for operating the camera device 462. In one embodiment, the camera device 462 may be operated by a signal received from the electronic watch 112 via the wireless charging terminal 436.

Figure 13:
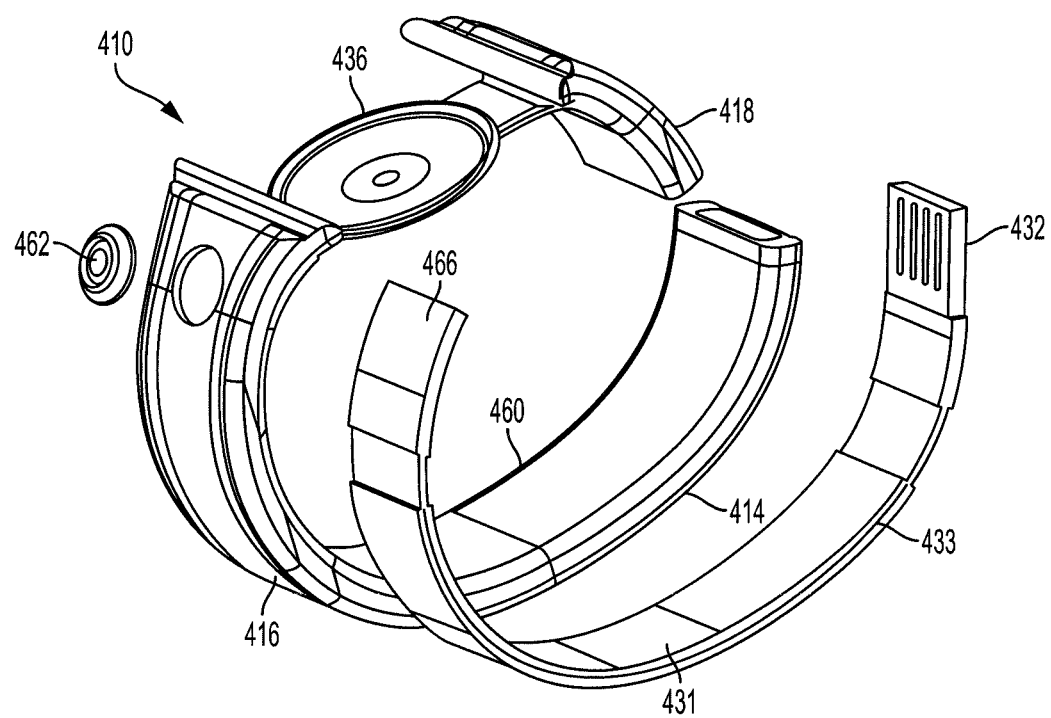
FIG. 13 illustrates a perspective view of the watch strap of FIG. 10 in a disassembled state.

FIG. 13 illustrates a view of interior components of the watch strap 410 separated from remaining portions of the strap 410. The camera device 462 may be positioned at an end of the first section 416 proximal the electronic watch 112. The battery 431 is electrically coupled to the power and/or data storage connector 432 to receive power from the power connector 432. The battery 431 may be shaped to extend longitudinally along the length of the watch strap 410. The strap 414 may form a sheath 460 that extends entirely around the circumference of the battery 431. A circuit board 466 may be electrically connected to the battery 431 and configured to control the camera device 462. The circuit board 466 may include a memory for storing an image received by the camera device 462. The circuit board 466 may include image processing circuitry for processing the image received by the camera device 462. A circuit board may be positioned in the second section 418 and configured to detect a user activating the power switch 456. A signal from the power switch 456 may be transmitted through an electrical connector passing through the wireless charging terminal 436 or may be transmitted through the power and/or data storage connector 432 to control supply of power from the battery 431 to the wireless charging terminal 436. In one embodiment, a memory 433 may be coupled to the power and/or data storage connector 432.

Figure 14:
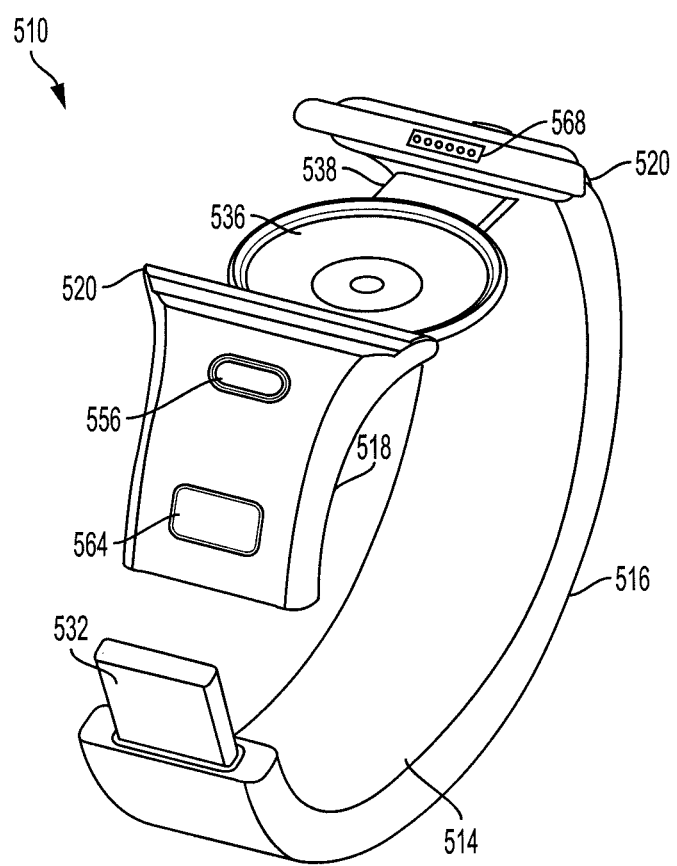
FIG. 14 illustrates a perspective view of a watch strap according to an embodiment of the present disclosure.
Figure 15:
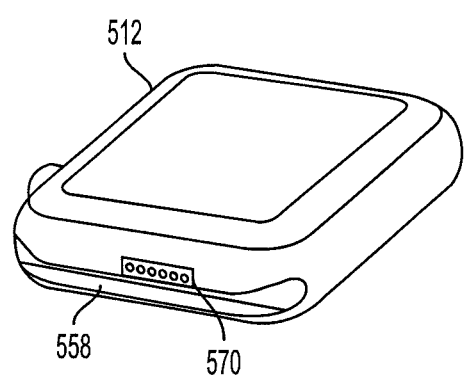
FIG. 15 illustrates a perspective view of an electronic watch according to an embodiment of the present disclosure.

FIG. 14 illustrates an embodiment of a watch strap 510 configured similarly as the watch strap 410 shown in FIGS. 10-13. The watch strap 510 includes a charging and/or data terminal 568 that is configured for conductive charging of an electronic watch and/or for receiving data from and transmitting data to the electronic watch. The charging and/or data terminal 568 may be configured to couple to a mating charging and/or data terminal 570 of the electronic watch 512, for example, as shown in FIG. 15. The charging and/or data terminal 568 may have at least one, or a plurality of contact points that are configured to couple to a mating charging and/or data terminal 570 of the electronic watch 512. As shown in FIG. 14, the contact points may be positioned adjacent to each other, and may be positioned on the coupler 520 of the watch strap 510. The charging and/or data terminal 568 may be configured to couple to the mating charging and/or data terminal 570 upon the coupler 520 being coupled to the electronic watch 512.

The charging and/or data terminal 568 may be wired in a similar manner as the wireless charging terminal 436 shown in FIG. 10, however, the charging and/or data terminal 568 may be configured for conductive rather than wireless charging. The charging and/or data terminal 568 may be used in combination with the wireless charging terminal 536. In one embodiment, the charging and/or data terminal 568 may be selectively activated by a user to allow for conductive charging of the electronic watch, as an alternative to the wireless charging provided by the wireless charging terminal 536. In one embodiment, a combination of the charging and/or data terminal 568 and the wireless charging terminal 536 may simultaneously charge the electronic watch 512.

In one embodiment, the charging and/or data terminal 568 may be used as a substitute for the wireless charging terminal 536. For example, the charging provided by the watch strap 510 may be conductive, with no wireless charging provided by the watch strap 510.

In one embodiment, the charging and/or data terminal 568 may transfer data to and from the electronic watch 512 using the charging and/or data terminal 568. A charging and/or data terminal 568 may be incorporated in any of the embodiments of watch straps disclosed in this application, and may be used as a substitute for any of the wireless charging terminals in any of the embodiments of watch straps disclosed in this application. In one embodiment, the structure of the charging and/or data terminal 568 may vary as shown in FIG. 14. A plug, port, or other form of charging and/or data terminal may be utilized. The structure of the charging and/or data terminal 568 may be configured to mate with the structure of a mating charging and/or data terminal of an electronic watch.

FIG. 15 illustrates a perspective view of the electronic watch 512 including a mating charging and/or data terminal 570. A portion of the electronic watch is shown transparent to display the mating charging and/or data terminal 570. The mating charging and/or data terminal 570 may be configured to couple to charging and/or data terminal 568. The mating charging and/or data terminal 570 may be configured similarly as the charging and/or data terminal 568. The mating charging and/or data terminal 570 may be configured as at least one, or a plurality of contact points that are configured to couple to a charging and/or data terminal 568 of the watch strap 510. The contact points may be positioned adjacent to each other, and may be positioned within the mating connector 558 of the electronic watch 512. The mating charging and/or data terminal 570 may be configured to couple to the charging and/or data terminal 568 upon the coupler 520 being coupled to the electronic watch 512, for example by being slid into the mating connector 558.

In one embodiment, the structure of the mating charging and/or data terminal 570 may vary than shown in FIG. 15. A plug, port, or other form of mating charging terminal may be utilized, and may be positioned in a different location on the electronic watch 512 than shown in FIG. 15.

Figure 16:
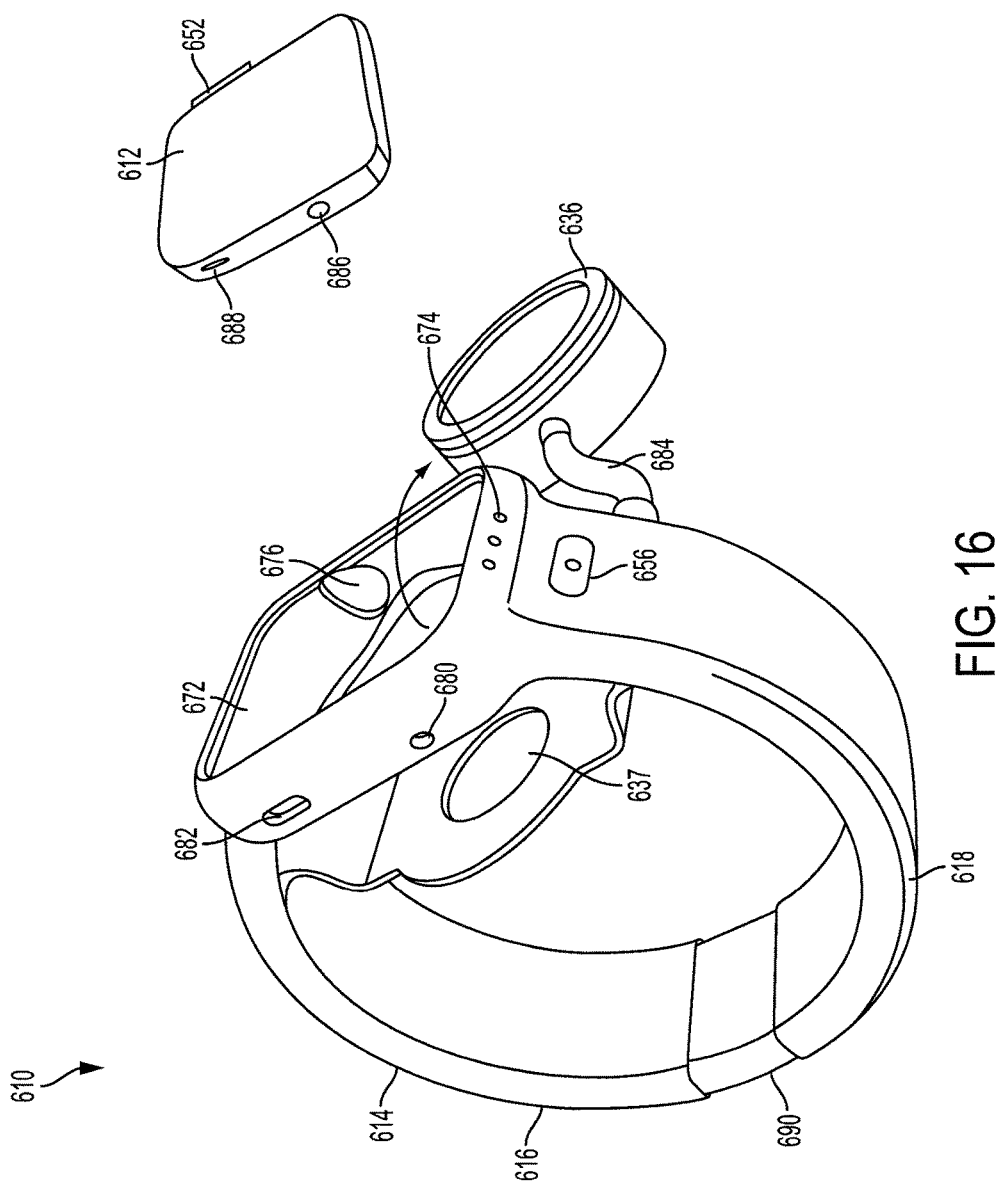
FIG. 16 illustrates a perspective view of a watch strap according to an embodiment of the present disclosure.

FIG. 16 illustrates a perspective view of a watch strap 610. The watch strap 610 may include a strap 614 having a first section 616 and a second section 618. The watch strap 610 may include a casing 672. The casing 672 may be coupled to the first section 616 and the second section 618. The casing may be positioned at the end of the strap section 616, 618. The casing 672 may be configured to encase the edges of an electronic watch 612 and hold the electronic watch 612. The electronic watch 612 may be removed from the casing 672.

The casing 672 may include a power indicator 674, e.g., an LED power indicator. The power indicator 674 may display the amount of power remaining in the battery. The power indicator 674 may use one or more illuminating indicators, e.g., an LED, to indicate different power level. For example, the power indicator may illuminate different battery power levels using multiple colors. A first color, e.g., red, may be illuminated when the remaining power is below a second threshold, such as 10%. The first color may indicate that the battery requires charging and is low on power. A second color, e.g., green, may be illuminated when the remaining power is above a second threshold, such as 90%.

The second color may indicate that the battery is nearly or fully charged. A third color, e.g., yellow, may be illuminated when the remaining power is between the first threshold and second threshold, such as between 10% and 90%. The third color may indicate that the battery has sufficient power to operate. In another example, the power indicator 674 may indicate a power level through the illumination of patterns, such as a flashing indicator. In one embodiment, the power indicator 674 may illuminate a particular number of the one or more indicators based on the power level of the battery. For example, a first indicator may be illuminated if the power of the battery is below a first threshold, e.g., 10%. The first indicator and a second indicator may be illuminated if the power of the battery is between the first threshold and a second threshold, e.g., 90%, and the first indicator, the second indicator, and a third indicator may be illuminated if the power of the battery is above the second threshold.

The casing 672 may include one or more apertures. The one or more apertures may be shaped to conform to one or more components, e.g., a microphone 686, a knob 652, or a speaker 688, of an electronic watch 612. For example, the knob 652 of the electronic watch may fit through the aperture 676. The microphone 686 of the electronic watch 612 may correspond with the aperture 680, and the speaker 688 of the electronic watch may correspond with the aperture 682.

The watch strap 610 may include a wireless charging terminal 636. The wireless charging terminal 636 may be coupled to an arm 684 that is connected to the strap 614. The arm 684 may swing the wireless charging terminal 636 outward from below the casing 672 so that the arm 684 of the wireless charging terminal 636 is at an angle to the strap 614. The arm may swing the wireless charging terminal outward between 0 and 90 degrees from below the casing 672 to allow one or more sensors of the electronic watch 612 to have direct contact with the skin of the user.

The watch strap 610 may include one or more apertures, e.g., aperture 637, positioned below the casing 672 and the wireless charging terminal 636. The aperture 637 may allow visible, infrared, or other forms of light to pass through. Camera devices of the electronic watch may transmit or receive light to or from the body of the user.

The watch strap 610 may include a power switch 656 or button. The power switch 656 may be coupled to the strap 614 and be configured for a user to turn on and off the supply of power to the electronic watch 612.

Figure 17:
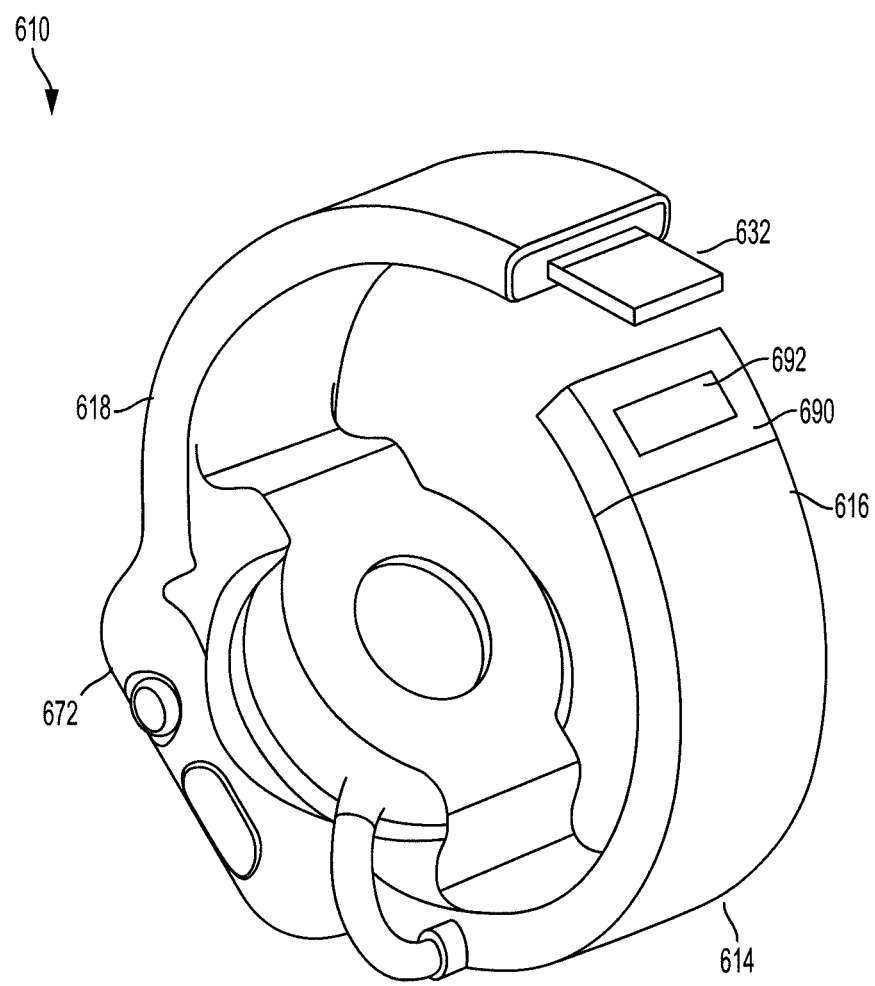
FIG. 17 illustrates a perspective view of the watch strap of FIG. 16 in a different position than shown in FIG. 16 according to an embodiment of the present disclosure.

FIG. 17 illustrates a perspective view of the watch strap of FIG. 16 in a different position than shown in FIG. 16. The watch strap 610 may include a fastener, such as a clasp 690, at one end of the first section 616 of the strap 614. The one end of the first section 616 being opposite of the end connected to the casing 672. The fastener may include a button 692 that is configured to release a battery and/or data storage connector 632 that is connected to the end of the second section 618 when the battery and/or data storage connector 632 is connected to or in a locked position with the fastener. The fastener may be made of a material, such as aluminum, plastic, titanium, or any other material or metal. In some embodiments, the fastener is at one end of the second section 618 and the battery and/or data storage connector 632 is connected to the end of the first section 616.

Figure 18:
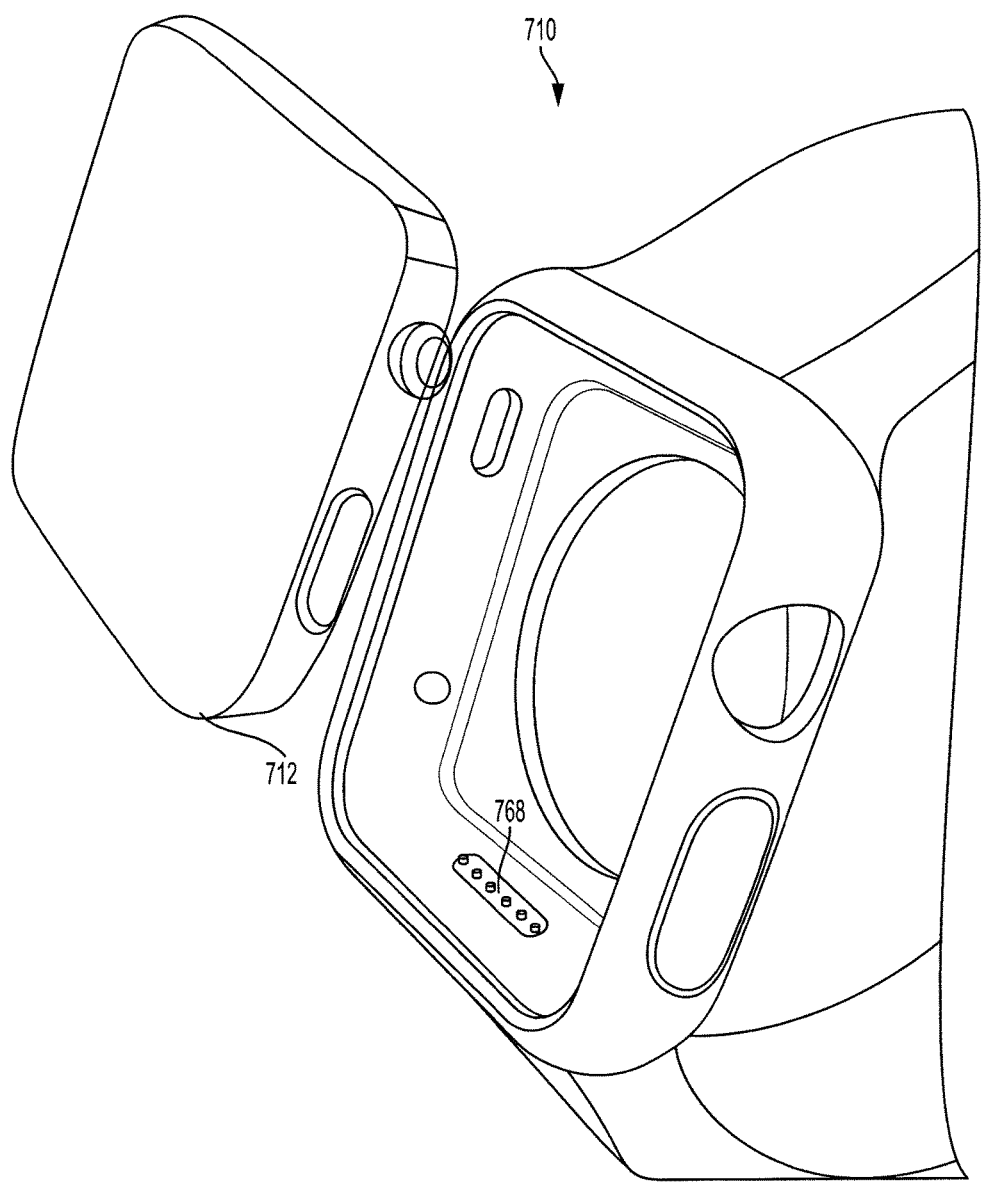
FIG. 18 illustrates an embodiment of a watch strap configured similarly as the watch strap shown in FIGS. 16 and 17 according to an embodiment of the present disclosure.

FIG. 18 illustrates an embodiment of a watch strap 710 configured similarly as the watch strap 610 shown in FIGS. 16-17. The watch strap 710 includes a charging and/or data terminal 768 that is configured for conductive charging of an electronic watch 712 and/or for data transfer with the electronic watch 712. The charging and/or data terminal 768 may have one or more contact points that are configured to couple to a mating and/or data terminal of the electronic watch 712. Charging and/or data terminal 768 power and data storage information may be displayed on the electronic watch 712, e.g., through an application.

The embodiments of the watch strap disclosed herein may beneficially allow for additional electrical power to be supplied to an electronic watch and for additional data storage to transmit data to and store data from the electronic watch. The additional electrical power and/or data storage may be stored in the watch strap and provided to the electronic watch as desired. The watch strap may additionally be moved to varied positions to expose the rear surface of the electronic watch as desired. The watch strap may be charged by a variety of methods, including wirelessly, through a wired connection, or through kinetic motion, among other methods. A power and/or data storage connector may extend from an end of the watch strap to enhance the ease with which an internal battery may be charged. A camera device may be included to allow a user to capture images with the watch strap.

Components of the embodiments of the watch strap may be interchanged and substituted across embodiments as desired. In one embodiment, the watch strap may be configured to couple to a portable electronic device that does or does not serve as an electronic watch.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary. The terms "approximate[ly]" and "substantial[ly]" represent an amount that may vary from the stated amount, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A watch strap for an electronic watch having at least one of a button or a knob, the watch strap comprising:
   a casing being integrally formed and having an open portion, a top sidewall, a bottom sidewall, a left sidewall, and a right sidewall, the open portion being configured to receive the electronic watch, and at least one of the left sidewall or the right sidewall having one or more apertures being configured to receive the at least one of the button or the knob and allow a user to directly engage the at least one of the button or the knob through the one or more apertures when the electronic watch is secured within the casing;
   a strap for extending over a wrist of the user, the strap including a first section and a second section, the first section having a first end coupled to the left sidewall and a second end, the second section having a first end coupled to the right sidewall and a second end;
   a power connector extending from the second end of the first section;
   a cavity positioned at the second end of the second section and configured to receive the power connector;
   a power source coupled to the strap and configured to be charged by power received from the power connector; and
   a wireless charging terminal configured to transmit power from the power source to the electronic watch.

2. The watch strap of claim 1, wherein the power source extends along a length of the strap.

3. The watch strap of claim 1, wherein the power source is flexible.

4. The watch strap of claim 1, wherein the power connector is configured to be inserted into the cavity to move the strap to a closed position, and is configured to be removed from the cavity to move the strap to an open position.

5. The watch strap of claim 1, wherein at least a portion of the wireless charging terminal is transparent to visible light and infrared light.

6. The watch strap of claim 1, wherein the wireless charging terminal is a plate configured to be positioned over a rear surface of the electronic watch to transmit power from the power source to the electronic watch.

7. A watch strap for an electronic watch, the watch strap comprising:
   a watch case being integrally formed and having an open portion, a top sidewall, a bottom sidewall, a left sidewall, and a right sidewall, at least one of the left sidewall or the right sidewall having one or more apertures being configured to receive a button or a knob of the electronic watch through the one or more apertures when the electronic watch is secured within the watch case;
   a strap for extending over a wrist of a user, the strap including a coupler configured to removably couple the strap to the electronic watch;
   a rechargeable battery that provides power and is coupled to the strap; and
   a wireless charging terminal coupled to the strap and configured to transmit the power from the rechargeable battery to the electronic watch.

8. The watch strap of claim 7, further comprising a power connector coupled to the strap and configured to receive power to charge the rechargeable battery.

9. The watch strap of claim 7, wherein the wireless charging terminal is a plate configured to be positioned over a rear surface of the electronic watch to transmit power from the rechargeable battery to the electronic watch.

10. The watch strap of claim 7, wherein the wireless charging terminal is configured to be magnetically attracted to a rear surface of the electronic watch.

11. The watch strap of claim 7, further comprising:
    an arm connected to the strap and coupled to the wireless charging terminal and being configured to move the wireless charging terminal between a first position from below the watch case to a second position that is outward from below the watch case and at an angle relative to the strap.

12. The watch strap of claim 7, further comprising a retainer device configured to retain the wireless charging terminal in a second position, wherein the wireless charging terminal is movable between a first position and the second position.

13. The watch strap of claim 7, further comprising a kinetic charging unit coupled to the strap and configured to transfer power to the rechargeable battery produced by movement of the wrist of the user.

14. A watch strap for an electronic watch having a first mating coupler, a second mating coupler, and at least one of a button or a knob, the watch strap comprising:
- a casing configured to receive the electronic watch;
- a first coupler configured to couple with the first mating coupler;
- a second coupler configured to couple with the second mating coupler, the at least one of the button or the knob being capable of being engaged by a user when the first coupler is coupled with the first mating coupler and the second coupler is coupled with the second mating coupler;
- a strap for extending over a wrist of the user, the strap including a first section and a second section, the first section having a first end coupled to the first coupler and a second end, the second section having a first end coupled to the second coupler and a second end;
- a power connector extending from the second end of the first section;
- a cavity positioned at the second end of the second section and configured to receive the power connector;
- a power source coupled to the strap and configured to be charged by power received from the power connector;
- a wireless charging terminal configured to transmit power from the power source to the electronic watch; and
- an arm connected to the strap and coupled to the wireless charging terminal and being configured to move the wireless charging terminal between a first position from below the casing to a second position that is outward from below the casing and at an angle relative to the strap.

15. The watch strap of claim 11, wherein the angle is between 0 and 90 degrees.

* * * * *